(12) United States Patent
Kim et al.

(10) Patent No.: US 11,862,401 B2
(45) Date of Patent: Jan. 2, 2024

(54) MULTILAYER CAPACITOR AND BOARD HAVING THE SAME MOUNTED THEREON

(71) Applicant: SAMSUNG ELECTRO-MECHANICS CO., LTD., Suwon-si (KR)

(72) Inventors: Tae Hoon Kim, Suwon-si (KR); Beom Seock Oh, Suwon-si (KR); Kyoung Ok Kim, Suwon-si (KR); Kwang Sic Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/133,218

(22) Filed: Apr. 11, 2023

(65) Prior Publication Data

US 2023/0245827 A1 Aug. 3, 2023

Related U.S. Application Data

(63) Continuation of application No. 17/512,131, filed on Oct. 27, 2021, now Pat. No. 11,651,898, which is a
(Continued)

(30) Foreign Application Priority Data

Jul. 18, 2019 (KR) .......................... 10-2019-0086962

(51) Int. Cl.
*H01G 4/232* (2006.01)
*H01G 4/012* (2006.01)
(Continued)

(52) U.S. Cl.
CPC ............. *H01G 4/232* (2013.01); *H01G 2/065* (2013.01); *H01G 4/012* (2013.01);
(Continued)

(58) Field of Classification Search
CPC .......... H01G 4/232; H01G 4/065; H01G 4/33; H01G 13/00; H01G 4/30; H01G 4/012;
(Continued)

(56) References Cited

U.S. PATENT DOCUMENTS

| 7,089,659 | B2* | 8/2006 | Iwaida | .................... | C04B 35/63 |
| | | | | | 156/89.12 |
| 7,295,420 | B2 | 11/2007 | Kojima et al. | | |

(Continued)

FOREIGN PATENT DOCUMENTS

| CN | 1832069 A | 9/2006 |
| CN | 1841594 A | 10/2006 |

(Continued)

OTHER PUBLICATIONS

U.S. Notice of Allowance dated Oct. 19, 2021 issued in U.S. Appl. No. 16/696,030.
(Continued)

*Primary Examiner* — Michael P McFadden
(74) *Attorney, Agent, or Firm* — Morgan, Lewis & Bockius LLP

(57) ABSTRACT

A multilayer capacitor and a board having the same mounted thereon are provided. The multilayer capacitor includes a capacitor body including dielectric layers and first and second internal electrodes, and first to sixth surfaces, the first internal electrode being exposed through the third surface and the fifth surface and the second internal electrode being exposed through the fourth surface and the sixth surface; first and second side portions disposed on the fifth and sixth surfaces, respectively, of the capacitor body; first and second external electrodes; a first step-compensating portion disposed on a margin portion in a width direction on the second dielectric layer on which the second internal electrode is formed on the first internal electrode; and a second step-
(Continued)

compensating portion disposed on another margin portion in the width direction on the first dielectric layer on which the first internal electrode is disposed on the second internal electrode.

18 Claims, 7 Drawing Sheets

Related U.S. Application Data continuation of application No. 16/696,030, filed on Nov. 26, 2019, now Pat. No. 11,189,423.

(51) Int. Cl.
  *H01G 4/33* (2006.01)
  *H01G 13/00* (2013.01)
  *H01G 4/224* (2006.01)
  *H01G 2/06* (2006.01)
  *H01G 4/12* (2006.01)

(52) U.S. Cl.
  CPC ........... *H01G 4/1227* (2013.01); *H01G 4/224* (2013.01); *H01G 4/33* (2013.01); *H01G 13/00* (2013.01)

(58) Field of Classification Search
  CPC .... H01G 4/1227; H01G 4/2325; H01G 4/008; H01G 4/0085; H01G 4/12; H01G 4/224
  See application file for complete search history.

(56) References Cited

U.S. PATENT DOCUMENTS

| | | | | |
|---|---|---|---|---|
| 2004/0190221 | A1* | 9/2004 | Yamaguchi | H01G 4/30 361/306.3 |
| 2006/0203420 | A1 | 9/2006 | Okuyama | |
| 2006/0214263 | A1* | 9/2006 | Kojima | H01G 4/30 257/532 |
| 2010/0008017 | A1* | 1/2010 | Ito | H01G 4/30 361/301.4 |
| 2012/0307415 | A1* | 12/2012 | Lee | H01G 4/005 361/301.4 |
| 2014/0362492 | A1 | 12/2014 | Lee et al. | |
| 2015/0200055 | A1 | 7/2015 | Ishida et al. | |
| 2015/0340156 | A1* | 11/2015 | Masunari | H01G 4/1227 361/301.4 |
| 2016/0087189 | A1* | 3/2016 | Lee | H01G 4/30 29/25.35 |
| 2016/0196917 | A1* | 7/2016 | Lim | H01G 4/012 361/301.4 |
| 2017/0154733 | A1 | 6/2017 | Lee | |
| 2018/0061577 | A1* | 3/2018 | Yasuda | H01G 4/0085 |
| 2018/0301281 | A1* | 10/2018 | Park | H01G 4/012 |
| 2019/0006107 | A1* | 1/2019 | Kim | H01G 4/012 |

FOREIGN PATENT DOCUMENTS

| | | |
|---|---|---|
| CN | 104779051 A | 7/2015 |
| CN | 108735507 A | 11/2018 |
| JP | 2006-278566 A | 10/2006 |
| KR | 10-2014-0142848 A | 12/2014 |

OTHER PUBLICATIONS

Chinese Office Action dated Sep. 17, 2021 issued in Chinese Patent Application No. 202010081369.5 (with English translation).

Non-Final U.S. Office Action dated Jul. 1, 2021 issued in U.S. Appl. No. 16/696,030.

U.S. Notice of Allowance dated Jan. 5, 2023 issued in U.S. Appl. No. 17/512,131.

Non-Final U.S. Office Action dated Sep. 20, 2022 issued in U.S. Appl. No. 17/512,131.

* cited by examiner

MULTILAYER CAPACITOR AND BOARD HAVING THE SAME MOUNTED THEREON

CROSS-REFERENCE TO RELATED APPLICATION(S)

This application is a continuation of U.S. patent application Ser. No. 17/512,131, filed on Oct. 27, 2021, which is a continuation of U.S. patent application Ser. No. 16/696,030, filed on Nov. 26, 20219, now U.S. Pat. No. 11,189,423, issued on Nov. 30, 2021, which claims benefit of priority to Korean Patent Application No. 10-2019-0086962 filed on Jul. 18, 2019 in the Korean Intellectual Property Office, the disclosures of which are incorporated herein by reference in their entireties.

TECHNICAL FIELD

The present disclosure relates to an electronic component.

BACKGROUND

Electronic components employing ceramic materials are commonly capacitors, inductors, piezoelectric elements, varistors or thermistors, and the like.

Among these electronic components, multilayer capacitors are used in various electronic devices as they are miniaturized and have high capacity.

Such multilayer capacitors include a capacitor body formed of a ceramic material, internal electrodes disposed inside the capacitor body, and external electrodes disposed on surfaces of the capacitor so as to be in contact with the internal electrodes.

In accordance with the miniaturization and multifunctionalization of electronic devices, there have recently been efforts to develop multilayer capacitors having thin dielectric layers and internal electrodes and margins and covers having reduced thickness for highly laminated products having significantly increased capacity.

However, such thinning and slimming of the margins and covers decrease reliability of the multilayer capacitors and increase likelihood of dielectric breakdown and short circuit fault rate.

In particular, such faults occur with a higher probability at an interface with margin portions compared to a center of the capacitor body.

SUMMARY

An aspect of the present disclosure is to provide a multilayer capacitor capable of obtaining above a certain level of reliability and reduce occurrence of a step at an interface between internal electrodes and margin portions to reduce deteriorations of reliability, the likelihood of dielectric breakdown and a short circuit fault rate.

According to an aspect of the present disclosure, a multilayer capacitor and a board having the same mounted thereon are provided. The multilayer capacitor includes a capacitor body including first and second dielectric layers and first and second internal electrodes, and a first surface and a second surface opposing each other, a third surface and a fourth surface connected to the first and second surfaces and opposing each other, and a fifth surface and a sixth surface connected to the first to fourth surfaces and opposing each other, the first internal electrode being exposed through the third surface and the fifth surface and the second internal electrode being exposed through the fourth surface and the sixth surface; first and second side portions disposed on the fifth and sixth surfaces, respectively, of the capacitor body; first and second external electrodes respectively disposed on the third and fourth surfaces of the body and respectively connected to the first and second internal electrodes; a first step-compensating portion disposed on a first margin portion in a width direction on the second dielectric layer on which the second internal electrode is disposed, the first step-compensating portion being disposed on the first internal electrode; and a second step-compensating portion disposed on a second margin portion in the width direction on the dielectric layer on which the first internal electrode is disposed, the second step-compensating portion being disposed on the second internal electrode.

In an example embodiment, a thickness of each of the first and second step-compensating portions may be smaller than a thickness of each of the first and second dielectric layers.

In an example embodiment, an average thickness of each of the first and second internal electrodes may be 0.41 μm or less.

In an example embodiment, the first and second external electrodes may include first and second connecting portions respectively disposed on the third and fourth surfaces of the capacitor body and respectively connected to the first and second internal electrodes; and first and second band portions respectively extending to a portion of the first surface of the body from the first and second connecting portions.

In an example embodiment, the first step-compensating portion and the first internal electrode may be made of a same material, and the second step-compensating portion and the second internal electrode may be made of a same material.

In an example embodiment, the first margin portion may be a portion in which the first and second internal electrodes do not overlap with each other, the first side portion may be disposed on the first margin portion, the second margin portion may be another portion in which the first and second internal electrodes do not overlap with each other, and the first side portion may be disposed on the first margin portion.

In an example embodiment, the first step-compensating portion may be exposed from the third and fifth surfaces, and the second step-compensating portion may be exposed from the fourth and sixth surfaces According to an aspect of the present disclosure, a board having a multilayer capacitor mounted thereon includes a board comprising first and second electrode pads on one surface; and the multilayer capacitor, where the first and second external electrodes are mounted on the first and second electrode pads to be connected thereto.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
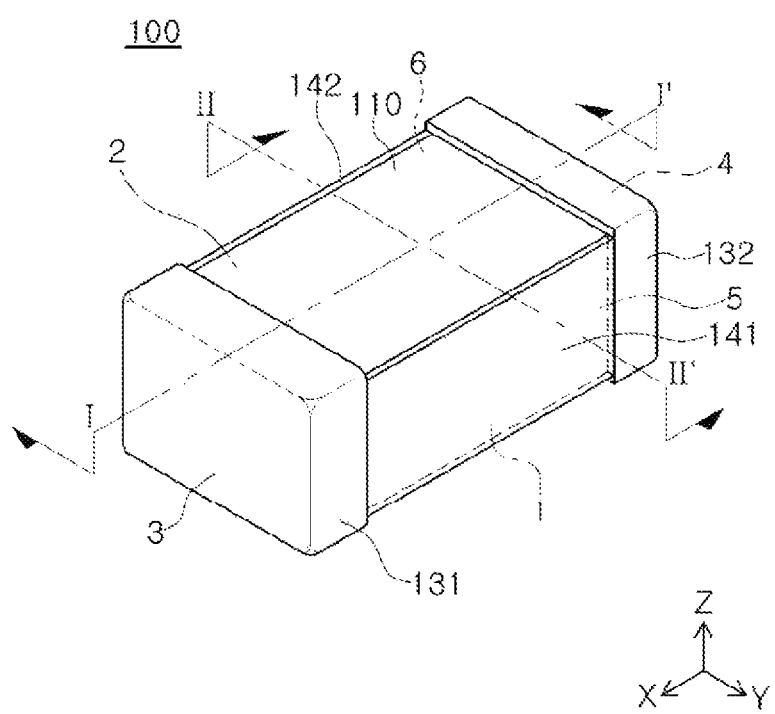
FIG. 1 is a schematic perspective view of a multilayer capacitor according to an example embodiment of the present disclosure.

Hereinafter, embodiments of the present disclosure will be described as follows with reference to the attached drawings.

However, the invention may be embodied in many different forms and should not be construed as being limited to the embodiments set forth herein.

Rather, these embodiments are provided so that this disclosure will be thorough and complete, and will fully convey the scope of the invention to those skilled in the art.

Accordingly, the shapes and dimensions of elements in the drawings may be exaggerated for clarity, and the same reference numerals will be used throughout to designate the same or like elements.

Further, the same reference numerals are used throughout the drawings for the elements having similar functions and activities.

In the specification, unless otherwise specifically indicated, when a certain part "includes" a certain component, it is understood that other components may be further included but are not excluded.

To clearly describe the example embodiments, X, Y and Z indicated in the drawings are defined to represent a length direction, a width direction and a thickness direction, respectively, of the multilayer capacitor.

Additionally, the Z direction may be used in the same sense as a lamination direction in which the dielectric layers are stacked up.

Figure 2A:
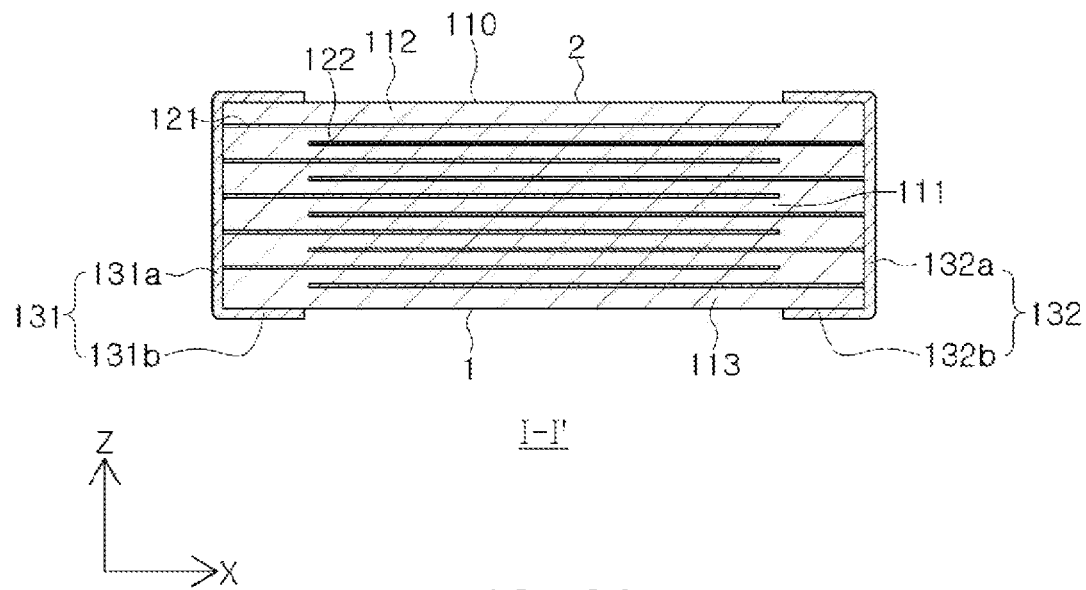
FIG. 2A is a cross-sectional view taken along line I-I' of FIG. 1 according to an example embodiment of the present disclosure.
Figure 2B:
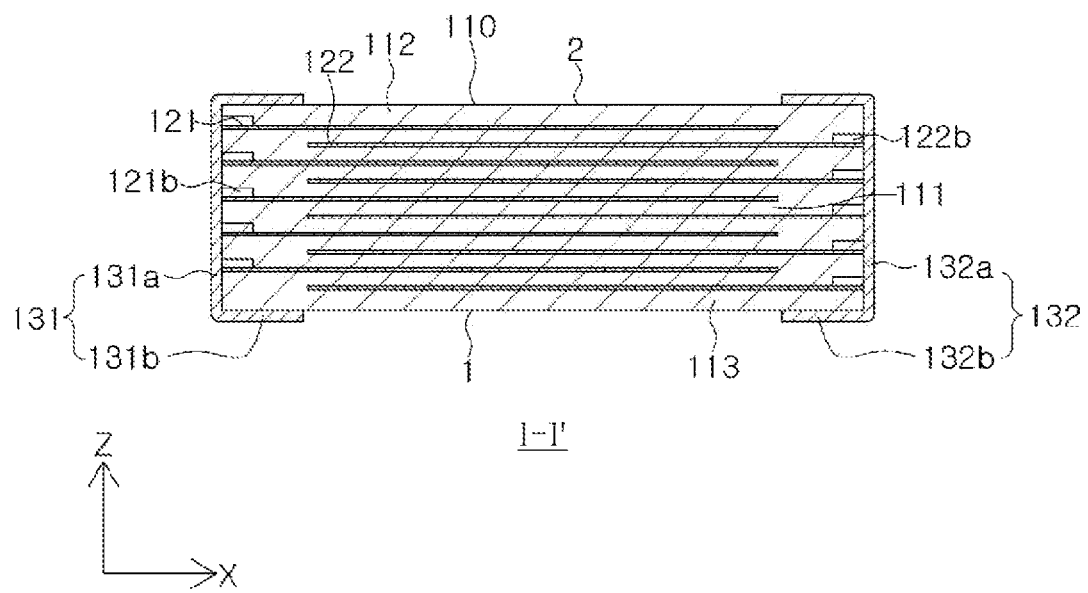
FIG. 2B is a cross-sectional view taken along line I-I' of FIG. 1 according to a modified embodiment of the present disclosure.
Figure 3:
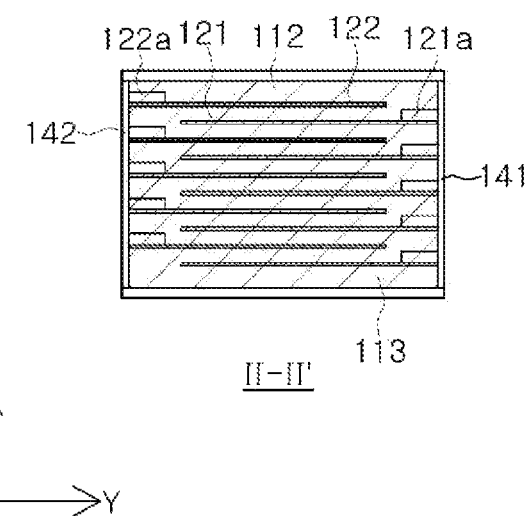
FIG. 3 is a cross-sectional view taken along line II-II' of FIG. 1.
Figure 4A:
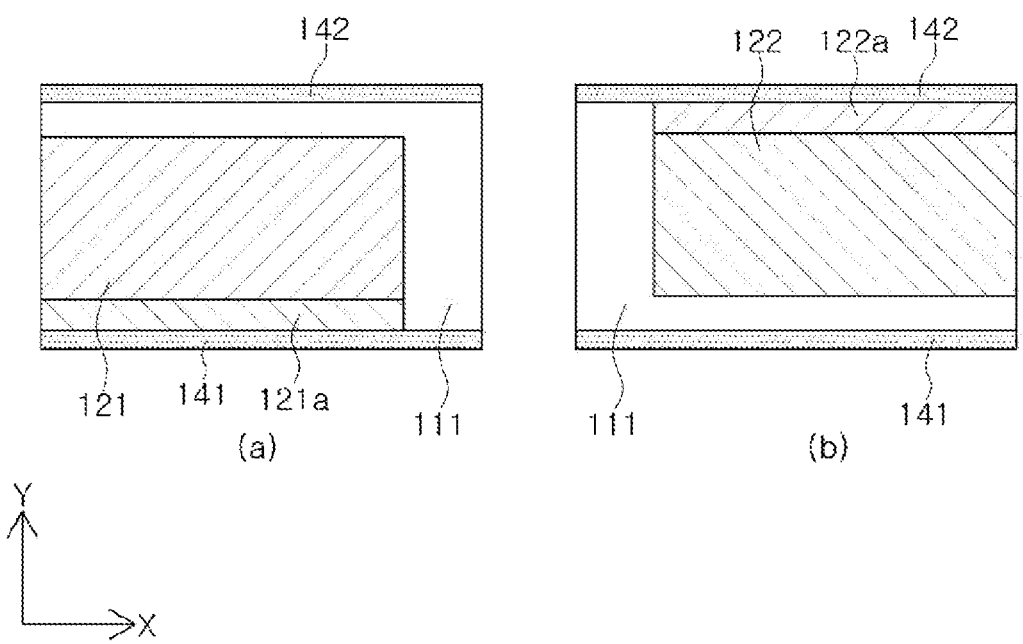
FIG. 4A is a plan view of first and second internal electrodes of a multilayer ceramic capacitor according to an exemplary embodiment.
Figure 4B:
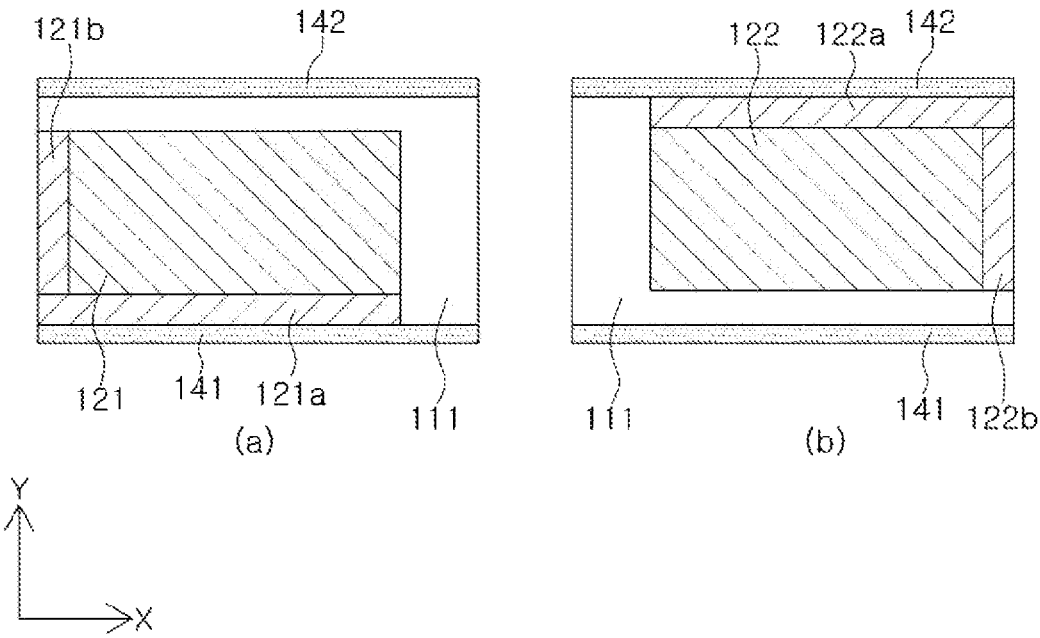
FIG. 4B is a plan view of first and second internal electrodes of a multilayer ceramic capacitor according to a modified embodiment.
Figure 5A:
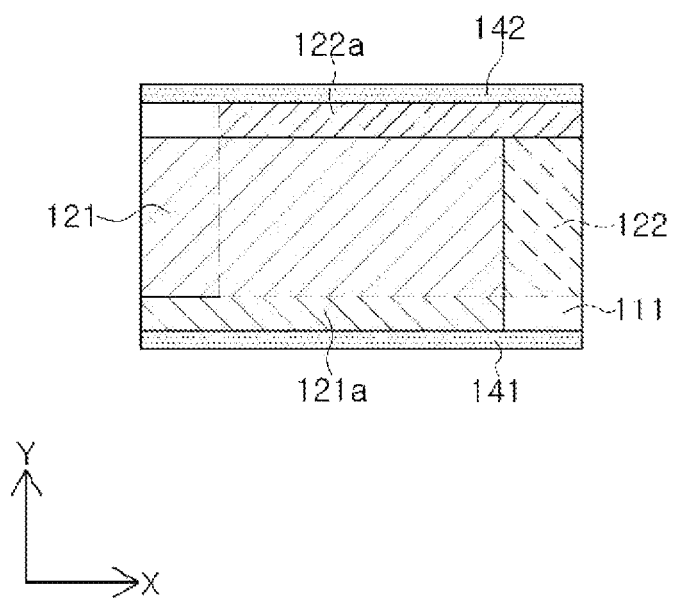
FIG. 5A is a plan view illustrating the first and second internal electrodes being overlapped according to an example embodiment of the present disclosure.
Figure 5B:
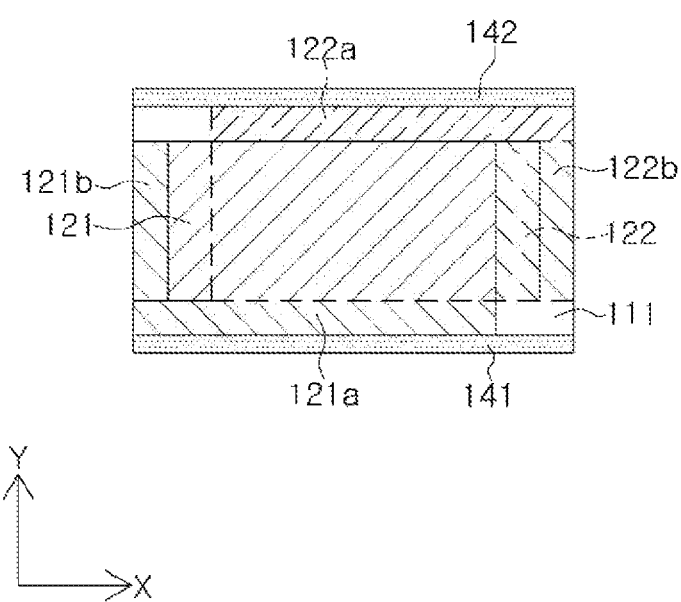
FIG. 5B is a plan view illustrating the first and second internal electrodes being overlapped according to a modified embodiment of the present disclosure.
Figure 6:
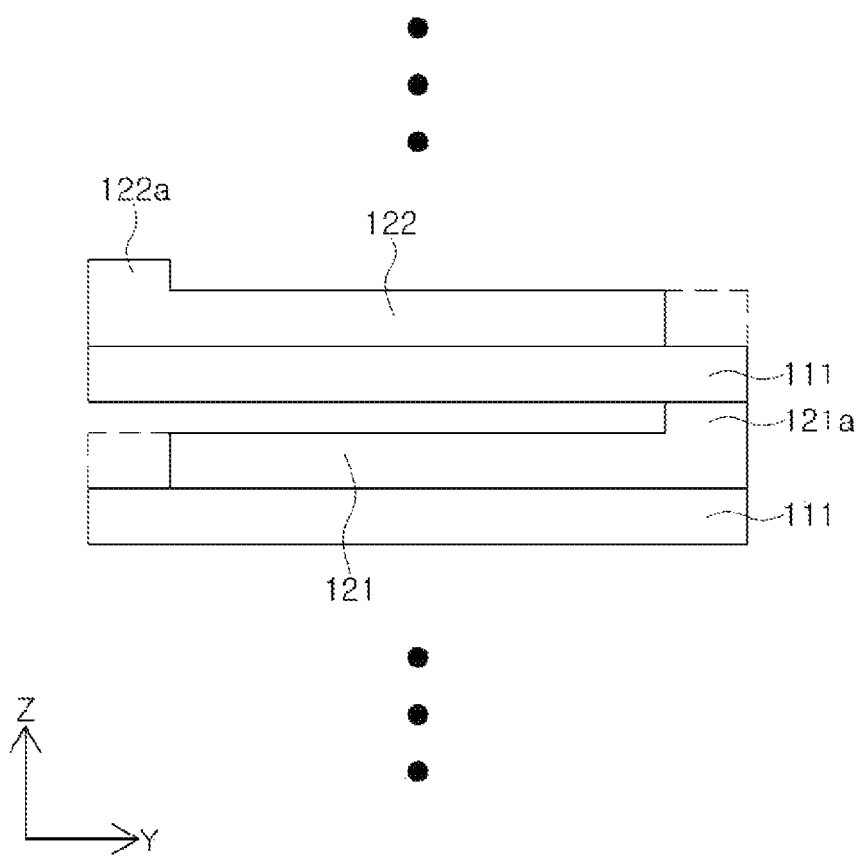
FIG. 6 is a schematic perspective view of a structure of a multilayer capacitor in which first and second internal electrodes are laminated.
Figure 7:
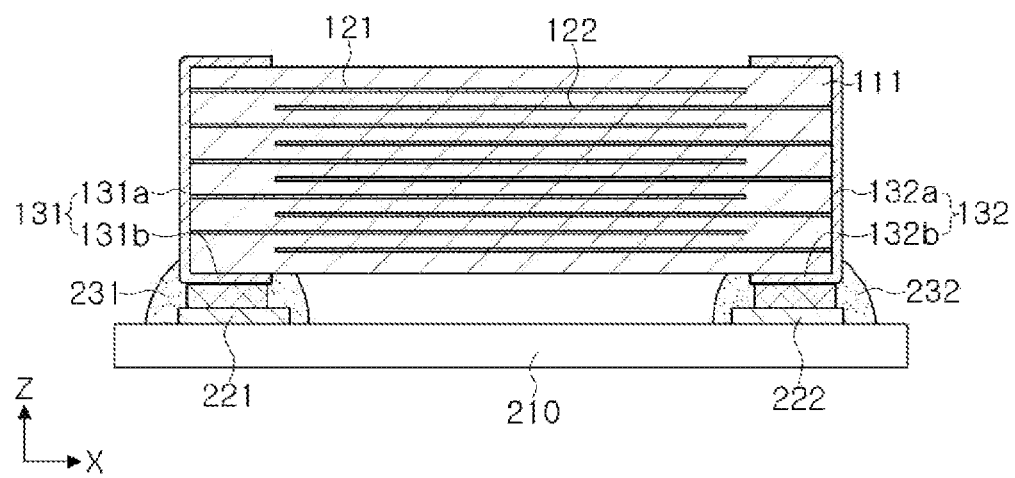
FIG. 7 is a perspective view of the multilayer capacitor of FIG. 1 mounted on a board.

FIG. 1 is a schematic perspective view of a multilayer capacitor according to an example embodiment of the present disclosure. FIG. 2A is a cross-sectional view taken along line I-I' of FIG. 1 according to an example embodiment of the present disclosure. FIG. 2B is a cross-sectional view taken along line I-I' of FIG. 1 according to a modified embodiment of the present disclosure. FIG. 3 is a cross-sectional view taken along line II-II' of FIG. 1. FIG. 4A is a plan view of first and second internal electrodes of a multilayer ceramic capacitor according to an exemplary embodiment. FIG. 4B is a plan view of first and second internal electrodes of a multilayer ceramic capacitor according to a modified embodiment. FIG. 5A is a plan view illustrating the first and second internal electrodes being overlapped according to an embodiment. FIG. 5B is a plan view illustrating the first and second internal electrodes being overlapped according to a modified embodiment. FIG. 6 is a schematic perspective view of a structure of a multilayer capacitor in which first and second internal electrodes are laminated. FIG. 7 is a perspective view of the multilayer capacitor of FIG. 1 mounted on a board.

Referring to FIGS. 1, 2A, 3, 4A, 5A, and 6, a multilayer capacitor 100 according to an exemplary embodiment of the present disclosure includes a capacitor body 110 including dielectric layers 111 and first and second internal electrodes 121 and 122, first and second side portions 141 and 142, first and second external electrodes 131 and 132, and first and second step-compensating portions 121a and 122a.

The capacitor body 110 is formed by laminating a plurality of the dielectric layers 111 in the Z direction and plasticizing the same. A configuration and a size of such capacitor body 110 and a number of the laminated dielectric layers 111 are not limited to those illustrated in the drawings.

Further, a plurality of the dielectric layers 111 forming the capacitor body 110 are sintered, and may be integrated with each other so that boundaries between adjacent dielectric layers 111 are not readily apparent without using a scanning electron microscope (SEM).

The configuration of the capacitor body 110 is not particularly limited, but may be hexahedral.

For convenience of description, surfaces of the capacitor body 110 opposing each other are defined as first and second surfaces 1 and 2, those opposing each other and connected to the first and second surfaces 1 and 2 are defined as third and fourth surfaces 3 and 4, and those opposing each other and connected to the first to fourth surfaces 1 to 4 are defined as fifth and sixth surfaces 5 and 6.

The dielectric layers 111 may contain ceramic powder, for example, $BaTiO_3$-based ceramic powder, or the like.

The $BaTiO_3$-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, or the like, in which calcium (Ca), zirconium (Zr), or the like, is included in $BaTiO_3$ (BT), but is not limited thereto.

In addition to the ceramic powder, a ceramic additive, an organic solvent, a plasticizer, a binder and a dispersant, or the like, may be further included in the dielectric layers 111.

The ceramic additive may include, for example, a transition metal oxide or a transition metal carbide, rare-earth element, magnesium (Mg), aluminum (Al), or the like.

The capacitor body 110 may include an active region including the first and second internal electrodes 121 and 122 and the dielectric layers 111 as a portion contributing to generation of capacity of a capacitor, and upper and low cover regions 112 and 113 disposed on upper and lower surfaces of the active region as a margin portion.

The upper and lower cover regions 112 and 113 may be formed of a material and may have a configuration the same as those of the dielectric layers 111 of the active region, except that the upper and lower cover regions 112 and 113 do not include internal electrodes. The upper and lower cover regions 112 and 113 may be formed by laminating a single dielectric layer or at least two dielectric layers on an upper surface and a lower surface of the active region in the Z direction.

Such upper and lower cover regions 112 and 113 may prevent damage to the first and second internal electrodes 121 and 122 caused by physical or chemical stress.

The first and second internal electrodes 121 and 122 are electrodes having different polarities and are formed by printing a conductive paste containing a conductive metal on the dielectric layers to a predetermined thickness.

The first and second internal electrodes 121 and 122 may be alternately laminated in the lamination direction with respective dielectric layers 111 interposed therebetween, and may be electrically insulated by the dielectric layers 111 interposed therebetween.

The first internal electrode 121 is formed to expose through the third and fifth surfaces 3 and 5 of the capacitor body 110.

The first internal electrode 121 may be exposed through a corner connecting the third and fifth surfaces 3 and 5 of the capacitor body 110.

The first step-compensating portion 121a is formed on a margin portion in a Y direction on the dielectric layer on which the second internal electrode 122 is formed on the first internal electrode 121.

The first step-compensating portion 121a may be formed to extend to an upper surface of the first internal electrode 121 in the Z direction. For example, the first step-compensating portion 121a may be made of the same material as the first internal electrode 121. The present disclosure, however, is not limited thereto. For another example, the first step-compensating portion 121a and the dielectric layer 111 may be made of the same material.

A thickness of the first step-compensating portion 121a may be the same as or smaller than that of the dielectric layer 111.

If the first step-compensating portion 121a is thicker than the dielectric layer 111, the first step-compensating portion 121a may give rise to a concave shape due to hyper-compensation, thereby causing an exterior defect of the capacitor body 110.

The second internal electrode 122 is formed to expose through the fourth and sixth surfaces 4 and 6 of the capacitor body 110.

The second internal electrode 122 may be exposed through a corner connecting the fourth and sixth surfaces 4 and 6 of the capacitor body 110.

The second step-compensating portion 122a may be formed on a margin portion in a Y direction on the dielectric layer on which the first internal electrode 121 is formed on the second internal electrode 122. For example, the second step-compensating portion 122a may be made of the same material as the second internal electrode 122. The present disclosure, however, is not limited thereto. For another example, the second step-compensating portion 122a and the dielectric layer 111 may be made of the same material.

The second step-compensating portion 122a may be formed to extend to an upper surface of the second internal electrode 122 in the Z direction.

A thickness of the second step-compensating portion 122a may be the same as or less than that of the dielectric layer 111.

If the second step-compensating portion 122a is thicker than the dielectric layer 111, the second step-compensating portion 122a may give rise to a concave shape due to hyper-compensation, thereby causing an exterior defect of the capacitor body 110.

In other words, the first and second internal electrodes 121 and 122 are configured to be alternately offset in the Y direction viewed on a Y-Z plane of the capacitor body 110 in order to reduce difference in density between the active region in which the internal electrodes are formed and the margin portions in which the internal electrodes are not formed.

As in the exemplary embodiment, the presence of the first and second internal electrodes 121 and 122 gives rise to not only an increased basic surface area of the first and second internal electrodes 121 and 122 but also an increased surface area of an overlapping area of the first and second internal electrodes 121 and 122, thereby increasing capacity of the multilayer capacitor 100.

Further, the first and second step-compensating portions 121a and 122a reduce a step generated by the internal electrodes and thus increase accelerated life of insulation resistance, thereby preventing delamination between layers or occurrence of a crack and deterioration of reliability of high temperature acceleration and moisture resistance loading. By enhancing BDV characteristics, insulation breakdown may also be prevented.

The first and second internal electrodes 121 and 122 may be in contact with and electrically connected to the first and second external electrodes 131 and 132, respectively, through the portion exposed through the third and fourth surfaces 3 and 4 of the capacitor body 110.

Accordingly, when voltage is applied to the first and second external electrodes 131 and 132, charge is accumulated between the first and second internal electrodes 121 and 122 facing each other.

Capacitance of the multilayer capacitor 100 is proportional to the surface area of the area where the first and second internal electrodes overlap.

One of silver (Ag), palladium (Pd), platinum (Pt), nickel (Ni) and copper (Cu) or alloys thereof may be used for the conductive metal contained in the conductive paste forming the first and second internal electrodes 121 and 122, but it is not limited thereto.

A method for printing the conductive paste may be a screen-printing method, a gravure printing method, or the like, but is not limited thereto.

A first side portion 141 is disposed on the fifth surface 5 of the capacitor body 110.

The first side portion 141 is in contact with the fifth surface 5 of the capacitor body 110 so as to cover the portion exposed through the fifth surface 5 of the capacitor body 110 in the first internal electrode 121.

The first side portion 141 may be formed of ceramic slurry or an insulating polymer material, or the like, but is not limited thereto.

Such first side portion 141 may compensate a margin on the fifth surface 5 of the capacitor body 110 in the Y direction, which is reduced by the offset arrangement of the first internal electrode 121.

A second side portion 142 is disposed on the sixth surface 6 of the capacitor 110.

Further, the second side portion 142 in contact with the sixth surface 6 of the capacitor body 110 so as to cover the portion exposed through the sixth surface 6 of the capacitor body 110 in the second internal electrode 122.

The second side portion 142 may be formed of ceramic slurry or an insulating polymer material, or the like, but is not limited thereto.

Such second side portion 142 may compensate a margin on the sixth surface 6 of the capacitor body 110 in the Y direction, which is reduced by the offset arrangement of the second internal electrode 122.

The first and second side portions 141 and 142 may protect the capacitor body 110 and the first and second internal electrodes 121 and 122 from external shock, or the like, and secure insulativity and moisture resistance reliability around the capacitor body 110.

The first and second external electrodes 131 and 132 are provided with voltage with different polarities and are disposed on the third and fourth surfaces 3 and 4 of the capacitor body 110, and are respectively connected to the portion of the first and second internal electrodes 121 and 122, which is exposed through the third and fourth surfaces 3 and 4 of the capacitor body 110.

The first external electrode 131 may include a first connection portion 131a and a first band portion 131b.

The first connection portion 131a is disposed on the third surface 3 of the capacitor body 110 and is in contact with an end portion of the first internal electrode 121, which is exposed externally through the third surface 3 of the capacitor body 110, to physically and electrically connect the first internal electrode 121 and the first external electrode 131.

The first band portion 131b extends from the first connection portion 131a to a portion of the first surface 1 of the capacitor body 110.

The first band portion 131b, if necessary, may further extend toward the second, fifth and sixth surfaces 2, 5 and 6 of the capacitor body 110 so as to partially cover one end portion of the first and second side portions 141 and 142 for improvement of adhesive strength.

The second external electrode 132 may include a second connection portion 132a and a second band portion 132b.

The second connection portion 132a is disposed on the fourth surface 4 of the capacitor body 110 and is in contact with an end portion of the second internal electrode 122, which is exposed externally through the fourth surface 4 of the capacitor body 110, to physically and electrically connect the second internal electrode 122 and the second external electrode 132.

The second band portion 132b extends from the first connection portion 132a to a portion of the first surface 1 of the capacitor body 110.

The second band portion 132b, if necessary, may further extend toward the second, fifth and sixth surfaces 2, 5 and 6 of the capacitor body 110 so as to partially cover the other end portion of the first and second side portions 141 and 142 for improvement of adhesive strength.

Such first and second external electrodes 131 and 132 may be formed by a conductive paste containing a conductive metal.

The conductive metal may be Ag, Ni, Cu or alloys thereof, but is not limited thereto.

Meanwhile, a plating layer (not illustrated) may be formed on the first and second external electrodes 131 and 132, if necessary.

The plating layer is for improvement of mutual adhesive strength between the multilayer capacitor 100 and a printed circuit board when mounting the multilayer capacitor 100 on the printed circuit board as a solder.

Such a plating layer may have a structure in which a nickel (Ni)-plating layer is formed on the first and second external electrodes 131 and 132 and a tin (Sn)-plating layer is formed on the Ni-plating layer, but is not limited thereto.

Meanwhile, in the exemplary embodiment, an average thickness of the first and second internal electrodes 121 and 122 may be 0.41 µm or less.

The multilayer capacitor 100 of the exemplary embodiment has a structure in which the first and second internal electrodes 121 and 122 are exposed through the fifth and sixth surfaces 5 and 6 of the capacitor body 110.

Referring to FIGS. 2B, 4B, and 5B, a multilayer capacitor according to a modified embodiment of the present disclosure may further include third and fourth step-compensating portions 121b and 122b, as compared to the above-described embodiment. A detailed description of the contents overlapping those described above is thus omitted.

The third step-compensating portion 121b and the fourth step-compensating portion 122b may be disposed on opposing edge portions of the capacitor body 110 in an X direction.

The third step-compensating portion 121b is formed on an edge portion in the X direction on the dielectric layer on which the second internal electrode 122 is formed on the first internal electrode 121. The third step-compensating portion 121b may be exposed from the third surface 3 and be spaced apart from the second internal electrode 122. The third step-compensating portion 121b may extend from the first step-compensating portion 121a in the Y direction.

The third step-compensating portion 121b may be formed to extend to an upper surface of the first internal electrode 121 in the Z direction. For example, the third step-compensating portion 121b may be made of the same material as the first internal electrode 121. The present disclosure, however, is not limited thereto. For another example, the third step-compensating portion 121b and the dielectric layer 111 may be made of the same material.

A thickness of the third step-compensating portion 121b may be the same as or smaller than that of the dielectric layer 111.

If the third step-compensating portion 121b is thicker than the dielectric layer 111, the third step-compensating portion 121b may give rise to a concave shape due to hyper-compensation, thereby causing an exterior defect of the capacitor body 110.

The fourth step-compensating portion 122b may be formed on another edge portion in the X direction on the dielectric layer on which the first internal electrode 121 is formed on the second internal electrode 122. For example, the fourth step-compensating portion 122b may be made of the same material as the second internal electrode 122. The present disclosure, however, is not limited thereto. For another example, the fourth step-compensating portion 122b and the dielectric layer 111 may be made of the same material. The fourth step-compensating portion 122b may be exposed from the fourth surface 4 and be spaced apart from the first internal electrode 121. The fourth step-compensating portion 122b may extend from the second step-compensating portion 122a in the Y direction.

The fourth step-compensating portion 122b may be formed to extend to an upper surface of the second internal electrode 122 in the Z direction.

A thickness of the fourth step-compensating portion 122b may be the same as or less than that of the dielectric layer 111.

If the fourth step-compensating portion 122b is thicker than the dielectric layer 111, the fourth step-compensating portion 122b may give rise to a concave shape due to hyper-compensation, thereby causing an exterior defect of the capacitor body 110.

Accordingly, as the margin portions are alternately laminated in the Y direction, saddle generated around the side portions of conventional multilayer capacitor can be resolved by reducing occurrence of a step in the end portions of the internal electrodes.

In addition, reliability would not be an issue even when the thickness of the first and second internal electrodes 121 and 122 is reduced and multilayered. In this regard, reliability can be secured for the multilayer capacitor 100 and capacity thereof can be increased.

Based on FIG. 7, a board, on which the multilayer capacitor of the exemplary embodiment is mounted, includes a board 210 having first and second electrode pads 221 and 222 on one surface thereof and a multilayer capacitor 100 mounted on a top surfaces of the board 210 so as that the first and second external electrodes 131 and 132 are connected to the first and second electrode pads 221 and 222, respectively.

In the exemplary embodiment, the multilayer capacitor 100 is illustrated and described as being mounted on the board 210 by solders 231 and 232; however, if necessary, a conductive paste may be used instead thereof.

According to the present disclosure, due to the side portions additionally attached after the internal electrodes are exposed through one surface of the capacitor body in the width direction, the surface area of the overlapped area of the internal electrodes is maximized, thereby increasing the capacity of the multilayer capacitor. Further, step-compensating portions are formed in the margin portions in the width direction, in which the internal electrodes are facing each other, so that occurrence of a step at an interface between the internal electrodes and the margin portions is reduced. Accordingly, deterioration of reliability of the multilayer capacitor and likelihood of dielectric breakdown and short circuit fault rate can be reduced.

While example embodiments have been shown and described above, it will be apparent to those skilled in the art that modifications and variations could be made without departing from the scope of the present disclosure as defined by the appended claims.

What is claimed is:

1. A multilayer capacitor, comprising:
    a capacitor body comprising first and second dielectric layers and first and second internal electrodes, and a first surface and a second surface opposing each other, a third surface and a fourth surface connected to the first and second surfaces and opposing each other, and a fifth surface and a sixth surface connected to the first to fourth surfaces and opposing each other, the first internal electrode being exposed through the third surface and the fifth surface and the second internal electrode being exposed through the fourth surface and the sixth surface;
    first and second side portions disposed on the fifth and sixth surfaces, respectively, of the capacitor body;
    first and second external electrodes respectively disposed on the third and fourth surfaces of the capacitor body and respectively connected to the first and second internal electrodes;
    a first protrusion disposed on a first margin portion in a width direction on the second dielectric layer on which the second internal electrode is disposed, the first protrusion being disposed on the first internal electrode; and
    a second protrusion disposed on a second margin portion in the width direction on the first dielectric layer on which the first internal electrode is disposed, the second protrusion being disposed on the second internal electrode,
    wherein an average thickness of each of the first and second internal electrodes is 0.41 µm or less.

2. The multilayer capacitor of claim 1, wherein a thickness of each of the first and second protrusions is smaller than or the same as a thickness of each of the first and second dielectric layers.

3. The multilayer capacitor of claim 1, wherein the first and second external electrodes comprise:
    first and second connecting portions respectively disposed on the third and fourth surfaces of the capacitor body and respectively connected to the first and second internal electrodes; and
    first and second band portions respectively extending to a portion of the first surface of the capacitor body from the first and second connecting portions.

4. The multilayer capacitor of claim 1, wherein the first protrusion and the first internal electrode are made of a same material, and the second protrusion and the second internal electrode are made of a same material.

5. The multilayer capacitor of claim 1, wherein the first margin portion is a portion of portions in which the first and second internal electrodes do not overlap with each other,
    the first side portion is disposed on the first margin portion,
    the second margin portion is another portion of the portions in which the first and second internal electrodes do not overlap with each other, and
    the second side portion is disposed on the second margin portion.

6. The multilayer capacitor of claim 1, wherein the first protrusion is exposed from the third and fifth surfaces, and
    the second protrusion is exposed from the fourth and sixth surfaces.

7. The multilayer capacitor of claim 1, further comprising:
    a third protrusion disposed on one edge portion in a length direction on the second dielectric layer on which the second internal electrode is disposed, the third protrusion being disposed on the first internal electrode; and
    a fourth protrusion disposed on another edge portion in the length direction on the first dielectric layer on which the first internal electrode is disposed, the fourth protrusion being disposed on the second internal electrode.

8. The multilayer capacitor of claim 7, wherein the third protrusion extends from the first protrusion in the width direction, and
    the fourth protrusion extends from the second protrusion in the width direction.

9. The multilayer capacitor of claim 7, wherein the third protrusion is exposed from the third surface, and
    the fourth protrusion is exposed from the fourth surface.

10. A board assembly having a multilayer capacitor mounted thereon, comprising:
    a board comprising first and second electrode pads on one surface; and
    a multilayer capacitor comprising a capacitor body comprising first and second dielectric layers and first and second internal electrodes, and a first surface and a second surface opposing each other, a third surface and a fourth surface connected to the first and second surfaces and opposing each other, and a fifth surface and a sixth surface connected to the first to fourth surfaces and opposing each other, the first internal electrode being exposed through the third surface and the fifth surface and the second internal electrode being exposed through the fourth surface and the sixth surface; first and second side portions disposed on the fifth and sixth surfaces, respectively, of the capacitor body; first and second external electrodes respectively disposed on the third and fourth surfaces of the capacitor body and respectively connected to the first and second internal electrodes; a first protrusion disposed on a first margin portion in a width direction on the second dielectric layer on which the second internal electrode is disposed, the first protrusion being disposed on the first internal electrode; and
    a second protrusion disposed on a second margin portion in the width direction on the first dielectric layer on which the first internal electrode is disposed, the second protrusion being disposed on the second internal electrode, wherein an average thickness of each of the first and second internal electrodes is 0.41 µm or less, wherein the first and second external electrodes are mounted on the first and second electrode pads to be connected thereto, respectively.

11. The board assembly of claim 10, wherein a thickness of each of the first and second protrusions is smaller than or the same as a thickness of each of the first and second dielectric layers.

12. The board assembly of claim 10, wherein the first and second external electrodes comprise:

first and second connecting portions respectively disposed on the third and fourth surfaces of the capacitor body and respectively connected to the first and second internal electrodes; and first and second band portions respectively extending to a portion of the first surface of the capacitor body from the first and second connecting portions.

13. The board assembly of claim 10, wherein the first protrusion and the first internal electrode are made of a same material, and the second protrusion and the second internal electrode are made of a same material.

14. The board assembly of claim 10, wherein the first margin portion is a portion of a portion in which the first and second internal electrodes do not overlap with each other, the first side portion is disposed on the first margin portion, the second margin portion is another portion of the portion in which the first and second internal electrodes do not overlap with each other, and the second side portion is disposed on the second margin portion.

15. The board assembly of claim 10, wherein the first protrusion is exposed from the third and fifth surfaces, and the second protrusion is exposed from the fourth and sixth surfaces.

16. The board assembly of claim 10, further comprising:

a third protrusion disposed on one edge portion in a length direction on the second dielectric layer on which the second internal electrode is disposed, the third protrusion being disposed on the first internal electrode; and a fourth protrusion disposed on another edge portion in the length direction on the first dielectric layer on which the first internal electrode is disposed, the fourth protrusion being disposed on the second internal electrode.

17. The board assembly of claim 16, wherein the third protrusion extends from the first protrusion in the width direction, and the fourth protrusion extends from the second protrusion in the width direction.

18. The board assembly of claim 16, wherein the third protrusion is exposed from the third surface, and the fourth protrusion is exposed from the fourth surface.

* * * * *